F. P. SNOW.
IRRIGATION VALVE.
APPLICATION FILED JULY 5, 1910.
999,409.
Patented Aug. 1, 1911.
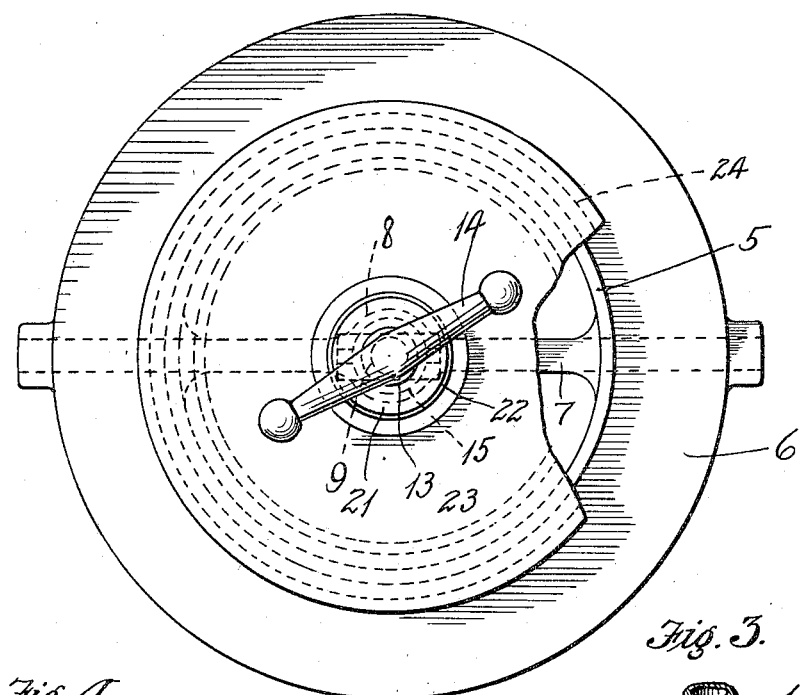
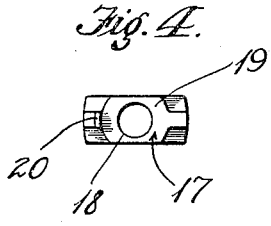
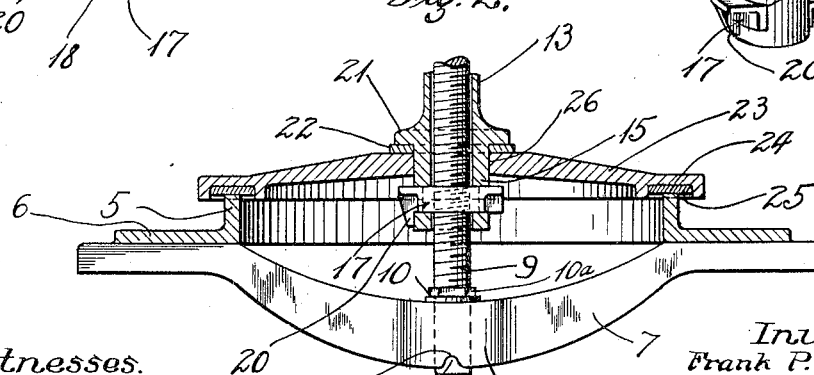
Witnesses.
Inventor:
Frank P. Snow.
by
Attys.

UNITED STATES PATENT OFFICE.

FRANK P. SNOW, OF LOS ANGELES, CALIFORNIA, ASSIGNOR TO KELLAR-THOMASON MANUFACTURING COMPANY, OF COVINA, CALIFORNIA, A CORPORATION OF CALIFORNIA.

IRRIGATION-VALVE.

999,409.  Specification of Letters Patent.  Patented Aug. 1, 1911.

Application filed July 5, 1910. Serial No. 570,246.

*To all whom it may concern:*

Be it known that I, FRANK P. SNOW, a citizen of the United States, residing at Los Angeles, county of Los Angeles, State of California, have invented certain new and useful Improvements in Irrigation-Valves, of which the following is a specification.

This invention relates to irrigation valves and particularly to such valves which employ a screw threaded connection for bringing the valve disk to its seat.

The object of the invention is to provide a construction which will prevent the corrosion of the threaded connection.

A further object of the invention is to improve the general construction of the valve.

In the drawing forming a part of the annexed specification, Figure 1 is a plan of a valve constructed according to my invention, a portion of the valve disk being broken away. Fig. 2 is a vertical central section through the valve, certain parts being shown in elevation. Fig. 3 is a perspective showing the lower end of the tubular spindle which is mounted upon the adjusting screw and showing a removable nut and the manner of securing the nut to this spindle. Fig. 4 is a bottom plan view of the nut representing the same as removed.

Referring more particularly to the parts, 5 represents the valve seat which is in the form of a vertical projecting flange formed integral with a base ring 6. Diametrically disposed across the base ring 6 there is provided a cross-bar 7 which is bowed downwardly as shown and at its middle point is formed into a boss 8, which forms a socket for the lower end of a threaded stem or adjusting screw 9. Just above the boss 8 the stem 9 has a nut 10ª seating on washer 10, which limits the downward movement, and the lower end of the stem is formed with laterally projecting lugs 11, which are received in notches 12 formed in the sides of the boss to prevent the stem 9 from rotating therein as will be readily understood.

On the stem 9 there is mounted a tubular spindle 13, the upper portion of which is formed with a handle 14 for rotating the spindle, and the lower portion of the spindle is formed into a tubular neck 15 of enlarged diameter, said neck being provided with a transverse slot 16 adapted to receive a nut 17 which may be slid laterally therethrough as indicated in Fig. 3. The stem 9 is preferably formed of brass, bronze or other non-corrosive material and the nut 17 should be formed of similar material. The nut 17 is in the form of an elongated block having a threaded bore 18 passing therethrough to engage the threads of the stem 9. The middle portion of the nut is formed into a substantially round boss 19 and near one end the nut is provided with a downwardly projecting lug 20 which limits its inward movement by striking the side of the tubular neck. This lug substantially centers the bore 18 with the tubular spindle 13. Adjacent to the neck 15 an enlarged collar 21 is formed, under which a washer 22 is provided and this washer seats on the upper side of the valve disk 23. The valve disk is of circular form as shown and slightly dished in an upper direction. Near its edge on its under side it is formed with an annular groove 24 in which there is received an annular gasket 25 which is adapted to come upon the valve seat 5 when the valve is closed as indicated in Fig. 2. The gasket 25 should be formed of leather, rubber or similar compressible material adapted to make the valve water-tight and the washer 22 should be formed of brass or similar material. The valve disk 23 has a central opening 26 through which the neck 15 passes loosely as shown, but the valve will not leak at this point by reason of the washer 22.

With a valve constructed as described, the threaded connection will not corrode on account of the material out of which it is formed, but at the same time if the nut 17 should become worn, the spindle 13 can be unscrewed from the stem and the worn nut can be replaced by a new one. It should be understood that the upper end of the tubular spindle 13 is closed and is located beyond the end of the stem 9. From this arrangement it is impossible for the valve to leak through the threaded connection.

Attention is called to the fact that the disk 23 is loose on the neck 15 so that a swivel connection is formed between the spindle and the disk and this swivel connection insures that the valve will seat constantly in different portions, which is a desirable feature tending to increase the water tightness of the valve.

What I claim is:—

1. A valve comprising a seat, a disk adapted to come upon said seat, a tubular spindle passing through said disk, a threaded stem receiving said tubular spindle and formed of non-corrosive material, and a nut removably mounted in said tubular spindle coöperating with said threaded stem and also formed of non-corrosive material.

2. A valve comprising a seat, a disk adapted to come upon said seat and having an opening therethrough, a tubular spindle passing through said opening and having a transverse slot therein, a nut of non-corrosive material received in said slot near the inner face of said disk, and a threaded stem passing down through said tubular stem having threaded engagement with said nut, and means for rotatably supporting the lower end of said threaded stem.

In witness that I claim the foregoing I have hereunto subscribed my name this 27th day of June, 1910.

FRANK P. SNOW.

Witnesses:
F. D. AMMEN,
EDMUND A. STRAUSE.

Copies of this patent may be obtained for five cents each, by addressing the "Commissioner of Patents, Washington, D. C."